(12) United States Patent
Xu et al.

(10) Patent No.: US 8,909,265 B2
(45) Date of Patent: Dec. 9, 2014

(54) METHOD AND SYSTEM FOR PROCESSING VALIDITY TIME IN TRIGGER INFORMATION

(75) Inventors: Hui Xu, Shenzhen (CN); Baoguo Xie, Shenzhen (CN); Zhijun Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/634,919

(22) PCT Filed: Nov. 28, 2011

(86) PCT No.: PCT/CN2011/083062
§ 371 (c)(1),
(2), (4) Date: Sep. 14, 2012

(87) PCT Pub. No.: WO2012/151963
PCT Pub. Date: Nov. 15, 2012

(65) Prior Publication Data
US 2014/0221026 A1    Aug. 7, 2014

(30) Foreign Application Priority Data

Sep. 30, 2011    (CN) .......................... 2011 1 0293991

(51) Int. Cl.
*H04W 4/00*    (2009.01)
*H04W 4/14*    (2009.01)
*H04W 60/04*   (2009.01)

(52) U.S. Cl.
CPC ................ *H04W 4/14* (2013.01); *H04W 4/005* (2013.01); *H04W 60/04* (2013.01)
USPC ....................................................... 455/466

(58) Field of Classification Search
USPC ................ 455/414.1, 456.1, 404.2, 433, 466; 370/230, 312, 395.2, 329, 328, 254; 379/201.1
See application file for complete search history.

(56) References Cited

U.S. PATENT DOCUMENTS

2011/0270984 A1* 11/2011 Park .............................. 709/225
2011/0276617 A1* 11/2011 Oksanen et al. .............. 709/201

FOREIGN PATENT DOCUMENTS

CN    102083171 A    6/2011
CN    102137105 A    7/2011

(Continued)

OTHER PUBLICATIONS

International Search Report for PCT/CN2011/083062 dated Jun. 13, 2012.

(Continued)

*Primary Examiner* — Kiet Doan
(74) *Attorney, Agent, or Firm* — Ling Wu; Stephen Yang; Ling and Yang Intellectual Property

(57) ABSTRACT

The present invention discloses a method for processing validity time in trigger information, including: a machine type communication (MTC) server sending the trigger information including the validity time (VT) to a network edge entity; the network edge entity setting a validity period (VP) of the trigger information in a short message service (SMS) according to the VT in a received trigger information; and forwarding the trigger information to a user equipment through a network node in the VP; the present invention further discloses a system for processing validity time in trigger information at the same time. Through the scheme of the present invention, the problem of how the validity time in the trigger information is set in the SMS and how to process in the network node that the SMS passes can be solved.

6 Claims, 4 Drawing Sheets

(56) References Cited

FOREIGN PATENT DOCUMENTS

CN        102149190 A     8/2011
WO        2011098150 A1   8/2011

OTHER PUBLICATIONS

"System Improvements for Machine-Type Communications"; 3rd Generation Partnership Project, Technical Specification Group Services and System Aspects; ; Release 11; 3GPP TR 23.888 V1.4.0 Aug. 2011; the whole document.

"Deferred Triggering"; Ericsson, St-Ericsson; Approval; 9.4.2.3 On-Line Device Trigger Aspects; SIMTC/Rel-11; SA WG2 Meeting #86; Jul. 11-15, 2011, Naantali, Finland; S2-113108; XP50548435A; see pp. 1-5.

"Solution of Suppressing Device Trigger"; HTC, KPN, Huawei, Hisilicon; Discussion and Approval; 9.4.2.3; SIMTC/Rel-11; SA WG2 Meeting #86 Jul. 11-15, 2011, Naantali, Finland; S2-113680; XP50548785A; see pp. 1-5.

* cited by examiner

METHOD AND SYSTEM FOR PROCESSING VALIDITY TIME IN TRIGGER INFORMATION

TECHNICAL FIELD

The present invention relates to the machine to machine (M2M) technology of the $3^{rd}$ generation partnership project (3GPP), and in particular, to a method and system for processing validity time in trigger information.

BACKGROUND OF THE RELATED ART

The M2M refers to all technologies and means of establishing connection among the machines. The M2M idea appears in 1990s last century, but it only remains at theory stage. After 2000, with the development of the mobile communication technology, it becomes possible to realize networking among the machine devices by the mobile communication technology. The M2M service appears in the market in about 2002 and develops rapidly in the subsequent several years, which becomes the focus of the numerous communication device traders and the telecommunication operators. Now, the quantity of machines in the global is much more than that of people, so the good market prospect of the M2M technology can be predicted.

The research on the M2M communication application scenarios indicates that providing the M2M communication in the mobile network has the potential market prospects. But the M2M service has put forward a lot of new requirements on the system, in order to strengthen the competitiveness of the mobile network in this respect, it is necessary to optimize the existing mobile network to support the M2M communication more effectively.

The existing mobile communication network is designed mainly aiming at the human-to-human communication, and the optimization on the communication of the machine-to-machine, the human-to-machine is insufficient. In addition, how can the operator provide the M2M communication service with the low cost is the key to success of the M2M communication deployment.

Because of the above-mentioned situations, it is necessary to research the solution that the mobile network supports the M2M communication and the solution should reuse the existing network to a high limit and reduce the influence on the network caused by the heavy M2M communication and the complexity of the operation maintenance.

The competition of the telecommunication market is becoming intense gradually at present, the expense is dropping constantly, the profit space of the operator is being reduced constantly, the communication market based on people is tending to the saturation, and the M2M is a brand-new development opportunity for the operator.

In order to utilize the mobile network resource effectively, the 3rd Generation Partnership Project (3GPP) proposes the machine type communication (MTC), that is, the service of the M2M and the machine-to-man communication, of which the service scope has far gone beyond the communication of Human to Human (H2H) in the past, and the MTC has very great difference at the respects such as access control, charging, security, quality of service (QoS), the service mode, etc., from the current H2H communication mode.

The MTC Device Trigger (hereafter referred to as trigger) is one of the basic demand for the MTC system, and the problem that the demand pays close attention to is that: in order to control the communication of the MTC device, the communication can be performed by adopting the way that the MTC server initiates the poll; for the communication initiated by the MTC device, it also needs the MTC server to inquire data from the MTC device sometimes. If the MTC server inquires with failure or the IP address of the MTC device is not available, then the MTC server can establish the communication with the MTC device by using the trigger. If the network cannot trigger the MTC device, then the network reports to the MTC server that the trigger is failed, and the trigger is implemented through the control plane signaling in the 3GPP.

The short message service (SMS) is for sending information between the Short Message Entity (SME) and the user equipment through the Service Centre (SC). The SMS includes the Mobile Originated (MO) and the Mobile Terminating (MT) service, that is, including that the user equipment sends and receives information. The network framework of sending the short message is as shown in FIG. 1, including the SME and the short message service-service centre (SMS-SC) outside the 3GPP or the GSM network, including the short message-gateway mobile switching center (SMS GMSC) or the short message-interworking mobile switching center (SMS IWMSC), the SMS router, the mobile switching center (MSC) or the visitor location register (VLR) or serving General Packet Radio Service (GPRS) support node (SGSN), the mobile station (MS) within the 3GPP or GSM network.

In order to realize the effective transmission of the trigger request, the already proposed scheme includes: sending the trigger through the short message SMS, or sending the trigger through the control plane signaling. For the way of sending the trigger through the control plane signaling, the MTC server sends the control plane signaling including the trigger information to the network node, and the network node analyzes the trigger information in the control plane signaling and then sends the trigger information to the user equipment. The network framework that the SMS sends the MTC trigger adopted in the 3GPP is as shown in FIG. 2: the MTC device connects to the 3GPP-born service, the SMS or the IP multimedia subsystem (IMS) through the air interface; the MTC server is connected to the MTC-IWF through the MTCsp interface, and is connected to the SMS-SC and the IP short message gateway (IP-SM-GW) through the MTCsms interface; and the MTC server is connected to the user equipment through the API interface.

Now only 2 items of the contents for the trigger information are confirmed in the 3GPP: the first is the MTC device identification, used for indicating the MTC device required to be triggered; the second is the validity time (VT), that is, the period for which the trigger information is kept in the 3GPP network; if this time is exceeded, then the 3GPP network deletes the trigger information.

In the SMS, the time that the SC keeps the short message is the Validity Period (VP), and the VP is set in the short message service submit (SMS-submit) message by the user equipment, to indicate, before the SC sends the short message to the receiving party, the time that the short message can be kept in the SC.

But in the related art, for sending the trigger information by adopting the SMS, how to set the VT in the trigger information in the SMS and how to process in network node that the SMS passes, etc., there is no definite solution.

CONTENT OF THE INVENTION

On that basis, the main objective of the present invention is to provide a method and system for processing validity time in trigger information, which can solve the problem of how the validity time in the trigger information is set in the SMS, how to process in the network edge entity, and how to process in the network node that the SMS passes, In order to achieve the above-mentioned objective, the technical scheme of the present invention is implemented like this:

the present invention provides a method for processing validity time in trigger information, comprising:

a machine type communication (MTC) server sending the trigger information including the validity time (VT) to a network edge entity;

the network edge entity setting a validity period (VP) of the trigger information in a short message service (SMS) according to the VT in the received trigger information; and the network edge entity forwarding the trigger information to a user equipment through a network node in the VP.

In the above scheme, the network edge entity is a service center (SC), or a MTC interworking function (MTC-IWF).

In the above scheme, the step of the network edge entity setting a VP of the trigger information in a SMS according to the VT in the received trigger information is:

the network edge entity storing a time of receiving the trigger information, and mapping a VT value in the received trigger information to a VP value of the trigger information in the SMS.

In the above scheme, the step of forwarding the trigger information to a user equipment through a network node in the VP is: after confirming that the trigger information is in the VP in the SMS, the network edge entity sending the trigger information in form of short message to a network node that the SMS passes, and the network node forwarding the trigger information to the user equipment.

In the above scheme, the method further comprises: after confirming that the trigger information is not in the VP in the SMS, the network edge entity deleting the trigger information, and sending a sending failure indication of the trigger information to the MTC server.

In the above scheme, the method further comprises: after receiving the short message of the trigger information, the user equipment sending a confirmation message to the network node, wherein, the confirmation message is forwarded to the network edge entity through the network node; and the network edge entity sending the confirmation message to the MTC server.

In the above scheme, after receiving the short message of the trigger information and judging that the short message of the trigger information is failed, the network node sends a short message failure report of the trigger information to the MTC server through the network edge entity.

In the above scheme, the network node comprises at least one of the follows: a serving general packet radio service (GPRS) support node (SGSN), a mobile management entity (MME), a gateway mobile switching center (GMSC).

The present invention provides a system for processing validity time in trigger information, comprising: a machine type communication (MTC) server, a network edge entity and a network node; wherein, the MTC server is used to send the trigger information including the validity time (VT) to the network edge entity;

the network edge entity is used to set a validity period (VP) of the trigger information in a short message service (SMS) according to the VT in the received trigger information; and forward the trigger information to a user equipment through the network node in the VP; and the network node is used to forward the trigger information to the user equipment.

In the above scheme, the network edge entity is specifically used to store a time of receiving the trigger information, and map a VT value in the received trigger information to a VP value of the trigger information in the SMS.

In the above scheme, the network node is further used to, after receiving a short message of the trigger information and judging that the short message of the trigger information is failed, send a short message failure report of the trigger information to the MTC server through the network edge entity.

In the above scheme, the system further comprises: a user equipment, used to, after receiving the short message of the trigger information, send a confirmation message to the network node, wherein, the confirmation message is forwarded to the network edge entity through the network node; and correspondingly, the network edge entity is used to send the confirmation message to the MTC server.

The present invention provides a method and system for processing validity time in trigger information. A MTC server sends the trigger information including the validity time (VT) to a network edge entity; the network edge entity sets a validity period (VP) of the trigger information in a short message service (SMS) according to the VT in a received trigger information; and forwards the trigger information to a user equipment through a network node in the VP; like this, the problem of how the validity time in the trigger information is set in the SMS, how to process in the network edge entity, and how to process in the network node that the SMS passes can be solved. By adopting the method and system of the present invention, it can implement that the trigger information is sent to the MTC user equipment through the short message in the validity time.

PREFERRED EMBODIMENTS OF THE PRESENT INVENTION

The basic idea of the present invention is: a machine type communication (MTC) server sending the trigger information including the validity time (VT) to a network edge entity; the network edge entity setting a validity period (VP) of the trigger information in a short message service (SMS) according to the VT in the received trigger information, and forwarding the trigger information to a user equipment through a network node in the VP.

The present invention is further described in detail with reference to the accompanying drawings and the specific embodiments hereinafter.

Figure 1:
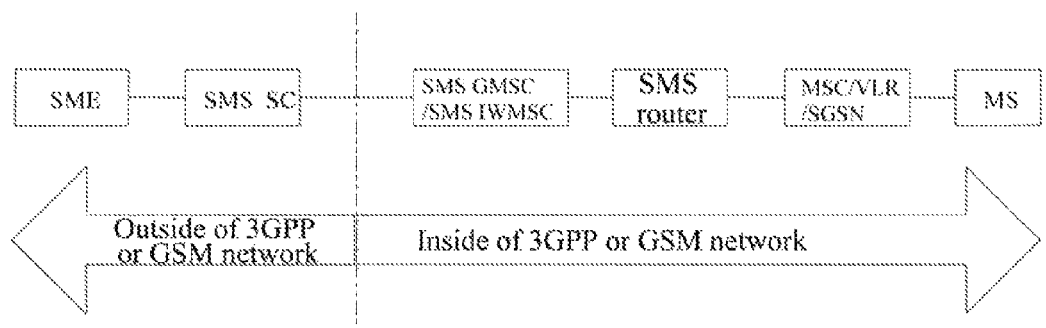
FIG. 1 is a network framework diagram of sending a short message in the related art.
Figure 2:
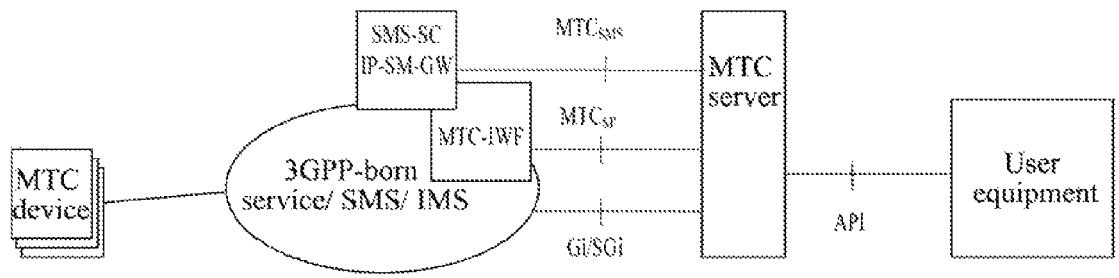
FIG. 2 is a network framework diagram of sending a MTC trigger by adopting the SMS in the 3GPP in the related art.
Figure 3:
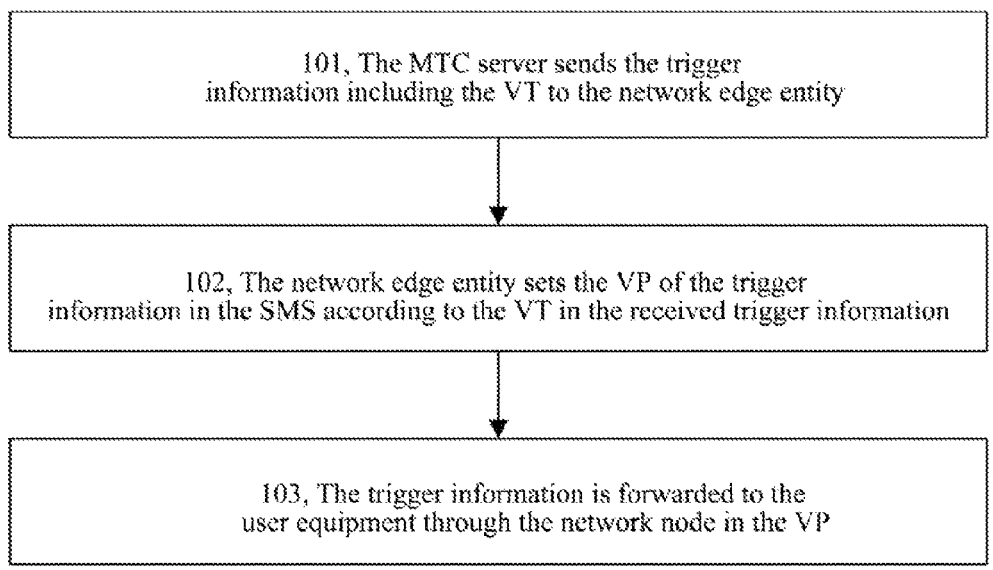
FIG. 3 is a flow chart of implementing a method for processing validity time in trigger information of the present invention.

The present invention implements a method for processing validity time in trigger information, as shown in FIG. 3. The method includes the following several steps:

in step 101, the MTC server sends the trigger information including the VT to the network edge entity;

specifically, the MTC server sets the VT for the trigger information, sends the trigger information including the VT to the network edge entity through the MTCsp interface or the MTCsms interface; the network edge entity may be a SC, or a MTC interworking function (MTC-IWF);

specifically, the MTC server sends the trigger information to the MTC-IWF through the MTCsp interface, and sends the trigger information to the SC through the MTCsms interface;

further, when the network edge entity is the MTC-IWF, the MTC server sends the trigger information including the VT to the MTC-IWF, and after the MTC-IWF receives the trigger information, it is judged whether to select to send the trigger information through the short message, if yes, then the MTC-IWF forwards the trigger information to the network node; otherwise the MTC-IWF does not forward the trigger information to the network node; the network node refers to the network node that the short message passes, which is at least one of the follows: the GMSC, the SGSN, the mobile management entity (MME).

The processing of the trigger information in the 3GPP network is diaphanous to the MTC server, that is, the MTC server does not know how to process the trigger information in the network, and the VT set by the MTC server is the whole time during which the trigger information stays in the 3GPP network.

The MTC server may locate outside the 3GPP network, or in the 3GPP network;

the VT is used to indicate how long it will spend for the 3GPP network before deleting the trigger information;

the MTCsp is the interface between the MTC server and the MTC-IWF, and, in this case, the SC may be a part of the MTC-IWF, or there is a directly connected interface between the MTC-IWF and the SC;

the MTC server or the MTC-IWF has the SME function, that is, the MTC server or the MTC-IWF may receive and send the short message;

the SC refers to the SC supporting the MTC, that is, using for relaying and storing the forwarded short message between the SME and the user equipment, and the SC may be an individual entity or an SMS-SC.

In step 102, the network edge entity sets the VP of the trigger information in the SMS according to the VT in the received trigger information;

specifically, the network edge entity stores the time of receiving the trigger information, and maps the VT value in the received trigger information to the VP value of the trigger information in the SMS;

the VP value is less than or equal to the VT value;

the VP is in an absolute format, or in a relative format, or in an enhanced format.

In step 103, the trigger information is forwarded to the user equipment through the network node in the VP.

The network node refers to the network node that the short message passes, which is at least one of the follows: GMSC, SGSN, MME;

specifically, after the network edge entity determines that the trigger information is in the VP in the SMS, the SC forwards the trigger information to the network node that the SMS passes in the form of short message; after receiving the short message of the trigger information, the network node forwards the short message of the trigger information to the user equipment;

the step of the network edge entity determining that the trigger information is in the VP in the SMS refers to that: the network edge entity judges whether the trigger information expires according to the VP of the trigger information in the SMS; if no, then it indicates that the trigger information is in the VP in the SMS;

further, after determining that the trigger information is not in the VP in the SMS, the network edge entity deletes the trigger information, and sends a sending failure indication of the trigger information to the MTC server;

it should be pointed out that: if the MTC server requires the network node to make a confirmation when the network node sends the short message of the trigger information successfully, then the corresponding network node reports to the MTC server after successfully sending the short message of the trigger information.

The above-mentioned method further includes: after receiving the short message of the trigger information, the user equipment sending a confirmation message to the network node, wherein, the confirmation message is forwarded to the network edge entity through the network node; and the network edge entity sends the confirmation message to the MTC server.

The above-mentioned method further includes: after receiving the short message of the trigger information, if the network node judges that the short message of the trigger information is failed, the network node sends a short message failure report of the trigger information to the MTC server through the network edge entity.

Figure 4:
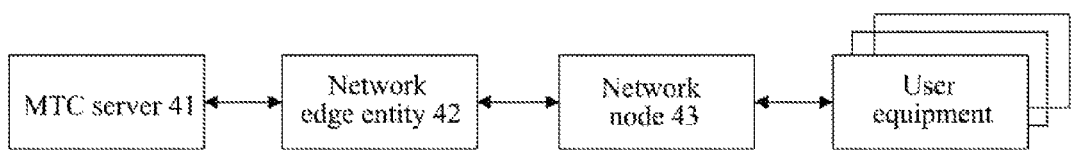
FIG. 4 is a structure diagram of implementing a system for processing validity time in trigger information of the present invention.

In order to realize the above-mentioned method, the present invention further provides a system for processing validity time in trigger information, as shown in FIG. 4. The system includes a machine type communication (MTC) server 41, a network edge entity 42 and a network node 43; wherein, the MTC server 41 is used to send the trigger information including the validity time (VT) to the network edge entity;

the network edge entity 42 is used to set a validity period (VP) of the trigger information in a short message service (SMS) according to the VT in a received trigger information; and forward the trigger information to a user equipment through a network node 43 in the VP;

the network node 43 is used to forward the trigger information to the user equipment;

the MTC server 41 is specifically used to set the VT for the trigger information, and send the trigger information including the VT to the network edge entity 42 via the MTCsp interface or the MTCsms interface;

the network edge entity 42 is specifically used to store a time of receiving the trigger information, and map a VT value in the received trigger information to a VP value of the trigger information in the SMS;

the network edge entity 42 is specifically used to, after confirming that the trigger information is in the VP in the SMS, forward the trigger information to the network node 43 that the SMS passes in the form of short message;

the network edge entity 42 is further used to, after confirming that the trigger information is not in the VP in the SMS, delete the trigger information, and send a sending failure indication of the trigger information to the MTC server 41;

the network node 43 is further used to, after receiving the short message of the trigger information and when judging that the short message of the trigger information is failed, send a short message failure report of the trigger information to the MTC server 41 through the network edge entity 42; where the network node 43 comprises at least one of the follows: GMSC, SGSN and MME;

the network edge entity can be an SC or an MTC-IWF;

the system further includes: a user equipment, used to, after receiving the short message of the trigger information, send a confirmation message to the network node 43, wherein, the confirmation message is forwarded to the network edge entity 42 through the network node 43; and correspondingly, the network edge entity 42 is used to send the confirmation message to the MTC server 41.

The implementation process and principle of the method of the present invention is described in detail by combining the embodiments hereinafter.

Embodiment One

Figure 5:
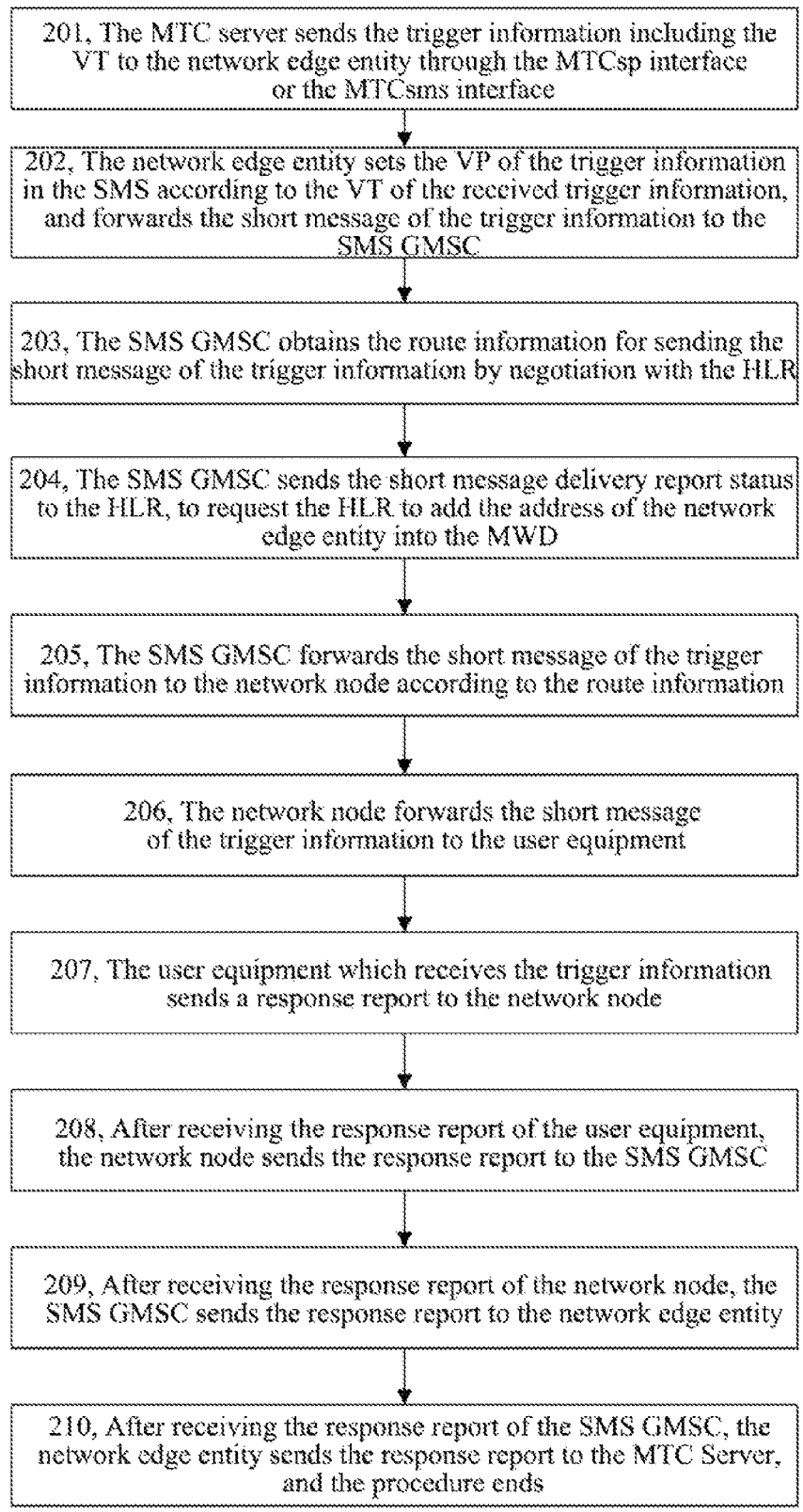
FIG. 5 is a flow chart of implementing a method for processing validity time in trigger information according to embodiment one of the present invention.

The present embodiment, aiming at the scenario of successfully sending the short message of the trigger information, realizes a method for processing the validity time in the trigger information, as shown in FIG. 5. The method includes the following several steps:

in step 201, the MTC server sends the trigger information including the VT to the network edge entity through the MTCsp interface or the MTCsms interface;

the MTC server infers the corresponding network edge entity according to the trigger information content; when inferring the corresponding MTC-IWF, the MTC server sends the trigger information including the VT to the MTC-IWF through the MTCsp interface; when inferring the corresponding SC, the MTC server sends the trigger information including the VT to the SC through the MTCsms interface;

the SC is an individual entity or is the SMS-SC;

the network edge entity is: the MTC-IWF or the SC;

in this step, when sending the trigger information through the MTCsp interface, the SC may be a composition unit of the MTC-IWF; the MTCsms interface may be a composition unit of the MTCsp interface;

if the SC is an individual entity, then there is a directly connected interface between the SC and the MTC-IWF.

In step 202, the network edge entity sets the VP of the trigger information in the SMS according to the VT of the received trigger information, and forwards the short message of the trigger information to the SMS GMSC;

specifically, the network edge entity maps the MTC device ID in the trigger information to the corresponding MSISDN or IMSI; the network edge entity obtains the network node corresponding to the target user equipment through the locally stored information or by inquiring the HSS/HLR; maps the VT value in the received trigger information to the VP value of the trigger information in the SMS; and forwards the short message of the trigger information to the SMS GMSC in the form of short message;

the VP refers to the time during which the short message of the trigger information is kept in the network edge entity; the VP may be in the absolute format, or the relative format, or the enhanced format;

one implementation method of mapping the VT to the VP is that: the VP is less than or equal to the VT.

In step 203, the SMS GMSC obtains the route information for sending the short message of the trigger information by negotiation with the HLR;

the route information may include the address information of the MSC, the SGSN and the SMS Router.

In step 204, the SMS GMSC sends the short message delivery report status (SM-DeliveryReportStatus) to the HLR, to request the HLR to add the address of the network edge entity into the message waiting data (MWD);

in step 205, the SMS GMSC forwards the short message of the trigger information to the network node according to the route information;

the network node includes at least one of the follows: the GMSC, the SGSN or the MME;

here, if the SMS Router is deployed in the HPLMN of the user equipment, then the short message of the trigger information is forwarded through the SMS Router.

In step 206, the network node forwards the short message of the trigger information to the user equipment;

the user equipment may be any one of the follows: User Equipment (UE), MS; where the user equipment is generally configured with the function of supporting the MTC characteristic.

In step 207, the user equipment which receives the trigger information sends a response report to the network node;

specifically, the user equipment, according to the IP address or port (addr/port) information of the MTC server in the trigger information, sends the response report including the confirmation message to the network node.

In step 208, after receiving the response report of the user equipment, the network node sends the response report to the SMS GMSC;

in step 209, after receiving the response report of the network node, the SMS GMSC sends the response report to the network edge entity;

in step 210, after receiving the response report of the SMS GMSC, the network edge entity sends the response report to the MTC Server, and the procedure ends.

Figure 6:
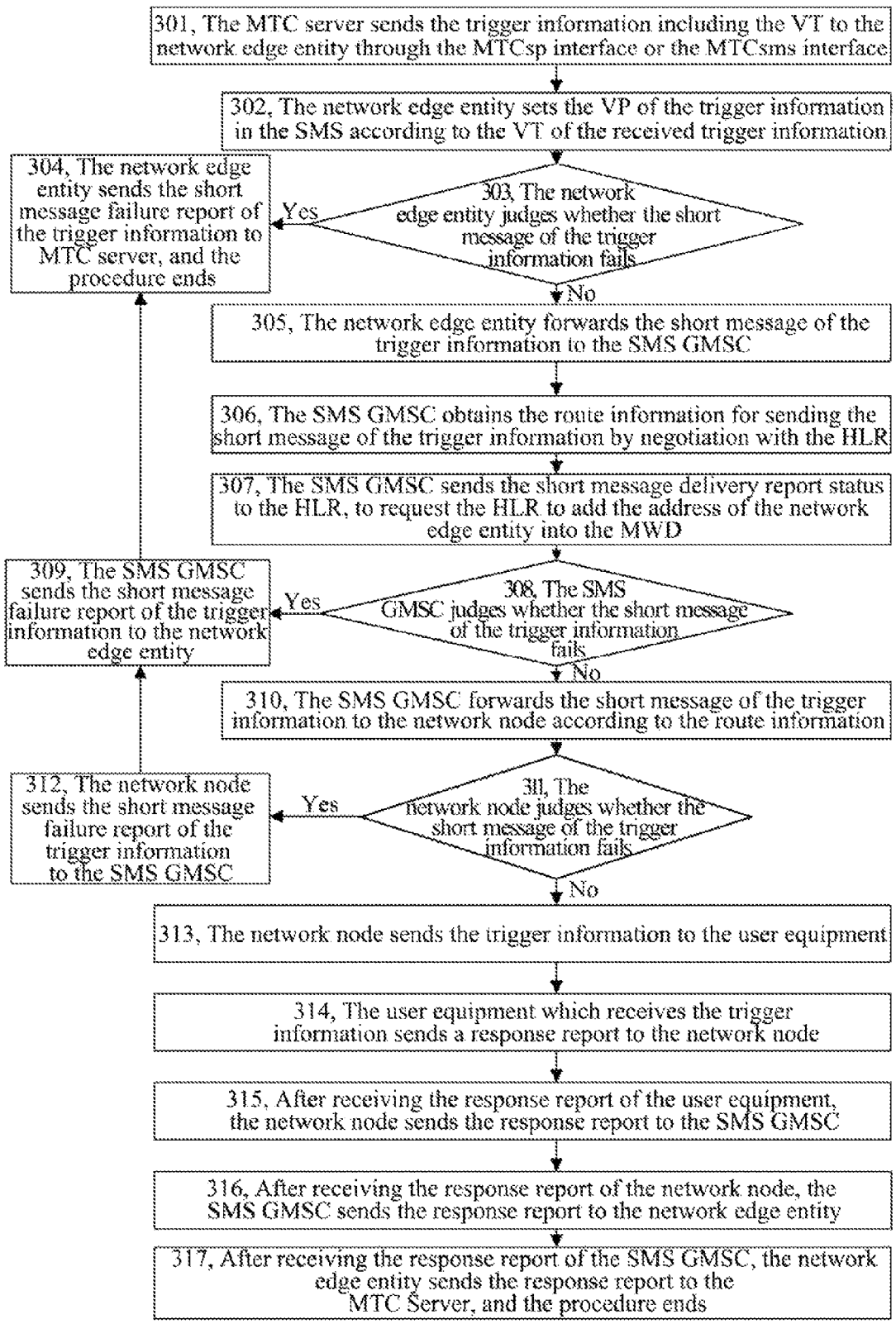
FIG. 6 is a flow chart of implementing a method for processing validity time in trigger information according to embodiment two of the present invention.

Embodiment Two the present embodiment, aiming at the scenario of sending the short message of the trigger information with failure, implements a method for processing the validity time in the trigger information, as shown in FIG. 6. The method includes the following several steps:

in step 301, the MTC server sends the trigger information including the VT to the network edge entity through the MTCsp interface or the MTCsms interface;

the MTC server infers the corresponding MTC-IWF or SC according to the trigger information content; when deducing the corresponding MTC-IWF, the MTC server sends the trigger information including the VT to the MTC-IWF through the MTCsp interface; when deducing the corresponding the SC, the MTC server sends the trigger information including the VT to the SC through the MTCsms interface;

the SC is an individual entity or the SMS-SC;

in this step, when sending the trigger information through the MTCsp interface, the SC may be a composition unit of the MTC-IWF; the MTCsms interface may be a composition unit of the MTCsp interface;

if the SC is an individual entity, then there is a directly connected interface between the SC and the MTC-IWF.

In step 302, the network edge entity sets the VP of the trigger information in the SMS according to the VT of the received trigger information;

specifically, the network edge entity maps the MTC device ID in the trigger information to the corresponding MSISDN or IMSI; the network edge entity knows the network node corresponding to the target user equipment through the locally stored information or by inquiring the HSS/HLR; and maps the VT value in the received trigger information to the VP value of the trigger information in the SMS;

the VP refers to the time during which the short message of the trigger information is kept in the network edge entity; the VP may be in the absolute format, the relative format, or the enhanced format;

one implementation method of mapping the VT to the VP is that: the VP is less than or equal to the VT.

In step 303, the network edge entity judges whether the short message of the trigger information fails, if yes, step 304 is executed, otherwise, step 305 is executed;

The failure of the short message of the trigger information refers to that: the network edge entity has not sent the short message of the trigger information in the VP, or the network edge entity receives the short message failure report of the trigger information from the SMS GMSC.

In step 304, the network edge entity sends the short message failure report of the trigger information to MTC server, and the procedure ends;

this step also includes: when the network edge entity has not sent the short message of the trigger information in the VP, the network edge entity deletes the short message of the local trigger information.

In step 305, the network edge entity forwards the short message of the trigger information to the SMS GMSC;

in step 306, the SMS GMSC obtains the route information for sending the short message of the trigger information by negotiation with the HLR;

the route information may include the address information of the MSC, the SGSN and the SMS Router.

In step 307, the SMS GMSC sends the short message delivery report status (SM-DeliveryReportStatus) to the HLR, to request the HLR to add the address of the network edge entity into the message waiting data (MWD);

in step 308, the SMS GMSC judges whether the short message of the trigger information fails, if yes, step 309 is executed, otherwise, step 310 is executed;

the step of the SMS GMSC judging whether the short message of the trigger information fails refers to that: the SMS GMSC determines that the validity time of the short message in the SMS GMSC expires, or the SMS GMSC receives the short message failure indication sent by the HLR, the MSC or the SGSN.

In step 309, the SMS GMSC sends the short message failure report of the trigger information to the network edge entity, and step 304 is executed.

In step 310, the SMS GMSC forwards the short message of the trigger information to the network node according to the route information;

the network node includes at least one of the follows: the GMSC, the SGSN or the MME;

here, if the SMS Router is deployed in the HPLMN of the user equipment, then the short message of the trigger information is forwarded through the SMS Router.

In step 311, the network node judges whether the short message of the trigger information fails, if yes, step 312 is executed, otherwise, step 313 is executed;

the network node judging whether the short message of the trigger information fails refers to: the network node determining that the validity time of the short message at the network node expires, or the network node receives the short message failure indication of the trigger information sent by the user equipment.

In step 312, the network node sends the short message failure report of the trigger information to the SMS GMSC, and step 309 is executed.

In step 313, the network node sends the trigger information to the user equipment;

the user equipment may be any one of the follows: User Equipment (UE), MS; the user equipment is generally configured with the function of supporting the MTC characteristic.

In step 314, the user equipment which receives the trigger information sends a response report to the network node;

specifically, the user equipment, according to the IP address or port information of the MTC server in the trigger information, sends the response report including the confirmation message to the network node.

In step 315, after receiving the response report of the user equipment, the network node sends the response report to the SMS GMSC.

In step 316, after receiving the response report of the network node, the SMS GMSC sends the response report to the network edge entity.

In step 317, after receiving the response report of the SMS GMSC, the network edge entity sends the response report to the MTC Server, and the procedure ends.

In the present embodiment, when the SMS GMSC receives the error indication from the network node, such as, an indication of lacking signing user, or the failure report, for example, the memory of the user equipment is full, then the SMS GMSC executes step 306.

Through the scheme of the present invention, the problem of how the validity time in the trigger information is set in the SMS, how to process in the network edge entity, and how to process in the network node that the SMS passes can be solved, thereby realizing that the trigger information is sent to the MTC user equipment through the short message in the validity time.

The above description is only preferred embodiments of the present invention, and does not intend to limit the protective scope of the present invention.

What is claimed is:

1. A method for processing validity time in trigger information, comprising:

a machine type communication (MTC) server sending the trigger information including the validity time (VT) to a network edge entity;

the network edge entity setting a validity period (VP) of the trigger information in a short message service (SMS) according to the VT in the received trigger information; and the network edge entity forwarding the trigger information to a user equipment through a network node in the VP;

wherein, the step of the network edge entity setting a VP of the trigger information in a SMS according to the VT in the received trigger information is:

the network edge entity storing a time of receiving the trigger information, and mapping a VT value in the received trigger information to a VP value of the trigger information in the SMS;

the network edge entity is a service center (SC), or a MTC interworking function (MTC-IWF);

wherein, the step of forwarding the trigger information to a user equipment through a network node in the VP is: after confirming that the trigger information is in the VP in the SMS, the network edge entity sending the trigger information in form of short message to a network node that the SMS passes, and the network node forwarding the trigger information to the user equipment; after confirming that the trigger information is not in the VP in the SMS, the network edge entity deleting the trigger information, and sending a sending failure indication of the trigger information to the MTC server.

2. The method according to claim 1, further comprising: after receiving the short message of the trigger information, the user equipment sending a confirmation message to the network node, wherein, the confirmation message is forwarded to the network edge entity through the network node; and the network edge entity sending the confirmation message to the MTC server.

3. The method according to claim 1, further comprising: after receiving the short message of the trigger information and judging that the short message of the trigger information is failed, the network node sending a short message failure report of the trigger information to the MTC server through the network edge entity.

4. The method according to claim 1, wherein, the network node comprises at least one of the follows: a serving general packet radio service (GPRS) support node (SGSN), a mobile management entity (MME), a gateway mobile switching center (GMSC).

5. A system for processing validity time in trigger information, comprising: a machine type communication (MTC) server, a network edge entity and a network node; wherein,
 the MTC server is used to send the trigger information including the validity time (VT) to the network edge entity;
 the network edge entity is used to set a validity period (VP) of the trigger information in a short message service (SMS) according to the VT in the received trigger information; and forward the trigger information to a user equipment through the network node in the VP; and
 the network node is used to forward the trigger information to the user equipment;
 wherein, the step of the network edge entity setting a VP of the trigger information in a SMS according to the VT in the received trigger information is:
 the network edge entity storing a time of receiving the trigger information, and mapping a VT value in the received trigger information to a VP value of the trigger information in the SMS;

the network edge entity is a service center (SC), or a MTC interworking function (MTC-IWF);

wherein, the network node forwarding the trigger information to a user equipment in the VP is: after confirming that the trigger information is in the VP in the SMS, the network edge entity sending the trigger information in form of short message to a network node that the SMS passes, and the network node forwarding the trigger information to the user equipment;

wherein the network node is further used to, after receiving a short message of the trigger information and judging that the short message of the trigger information is failed, send a short message failure report of the trigger information to the MTC server through the network edge entity.

6. The system according to claim 5, further comprising: a user equipment, used to, after receiving the short message of the trigger information, send a confirmation message to the network node, wherein, the confirmation message is forwarded to the network edge entity through the network node; and
 correspondingly, the network edge entity is used to send the confirmation message to the MTC server.

* * * * *